United States Patent
Bishop, III et al.

(10) Patent No.: US 11,144,436 B1
(45) Date of Patent: Oct. 12, 2021

(54) SYSTEM FOR TESTING AN APPLICATION WITH DYNAMICALLY LINKED SECURITY TESTS

(71) Applicant: BANK OF AMERICA CORPORATION, Charlotte, NC (US)

(72) Inventors: Jack Lawson Bishop, III, Evanston, IL (US); Timothy Andrew Wright, England (GB); Robert Riley Zink, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/073,576

(22) Filed: Oct. 19, 2020

(51) Int. Cl.
*G06F 11/36* (2006.01)
*G06F 21/57* (2013.01)
*G06F 16/958* (2019.01)

(52) U.S. Cl.
CPC ...... *G06F 11/3684* (2013.01); *G06F 11/3688* (2013.01); *G06F 16/958* (2019.01); *G06F 21/577* (2013.01); *G06F 2221/033* (2013.01)

(58) Field of Classification Search
CPC .............. G06F 11/1684; G06F 11/3688; G06F 16/958; G06F 21/577; G06F 2221/033
See application file for complete search history.

(56) References Cited

U.S. PATENT DOCUMENTS

| | | | | |
|---|---|---|---|---|
| 7,316,004 | B2 * | 1/2008 | Sluiman | G06F 11/3684 714/E11.208 |
| 7,836,368 | B2 | 11/2010 | Kapur et al. | |
| 7,975,296 | B2 * | 7/2011 | Apfelbaum | H04L 63/14 726/22 |
| 8,527,813 | B2 * | 9/2013 | Budnik | G06F 11/3688 714/32 |
| 8,583,722 | B1 * | 11/2013 | Gibson | H04L 29/08072 709/202 |
| 9,483,648 | B2 | 11/2016 | Hebert et al. | |
| 9,619,375 | B2 | 4/2017 | Avgerinos et al. | |
| 9,715,592 | B2 * | 7/2017 | Compagna | H04L 63/1433 |
| 9,870,314 | B1 * | 1/2018 | Vyas | G06F 11/3692 |
| 9,894,090 | B2 * | 2/2018 | Hebert | H04L 63/1408 |
| 9,940,222 | B2 | 4/2018 | Li et al. | |
| 10,210,335 | B2 * | 2/2019 | Madou | G06F 11/3688 |
| 10,382,473 | B1 | 8/2019 | Ashkenazy et al. | |
| 10,592,398 | B1 * | 3/2020 | Dwarakanath | G06F 11/3688 |

(Continued)

*Primary Examiner* — Douglas M Slachta

(74) *Attorney, Agent, or Firm* — Michael A. Springs; Moore & Van Allen PLLC; R. W. McCord Rayburn

(57) ABSTRACT

Systems, computer program products, and methods are described herein for testing an application with dynamically linked security tests. The present invention may be configured to perform, using a request engine, based on the first data, and based on test protocols stored in a first data structure, a first security test on an application. The present invention may be further configured to determine, based on determining that the application failed the first security test and based on a second data structure, whether the first security test is linked to one or more other security tests, where the second data structure includes security test sequences linking security tests and/or data to transmit from the first security test to the one or more other security tests, and provide, to the first queue, one or more other security tests to which the first security test is linked.

20 Claims, 3 Drawing Sheets

(56) References Cited

U.S. PATENT DOCUMENTS

| | | | |
|---|---|---|---|
| 2011/0107395 A1* | 5/2011 | Takala | G06F 21/575 |
| | | | 726/2 |
| 2016/0364310 A1* | 12/2016 | Maple | G06F 11/00 |
| 2017/0075784 A1* | 3/2017 | Nakanishi | G06F 11/263 |
| 2018/0330102 A1 | 11/2018 | Siman et al. | |
| 2019/0245883 A1 | 8/2019 | Gorodissky et al. | |
| 2020/0278920 A1* | 9/2020 | Khakare | G06F 9/45558 |

* cited by examiner

SYSTEM FOR TESTING AN APPLICATION WITH DYNAMICALLY LINKED SECURITY TESTS

FIELD OF THE INVENTION

The present invention embraces a system for testing an application with dynamically linked security tests.

BACKGROUND

Security of an application may be tested by performing dynamic application security tests ("DAST") that each simulate an individual method that may be used to attempt to obtain unauthorized control of and/or access to the application, a system running the application, and/or the like and logging the response of the application to the security test. The log of application responses to DAST may be analyzed to reveal weaknesses (e.g., flaws, faults, bugs, vulnerabilities, and/or the like) of the application that may be potential security vulnerabilities.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for testing an application with dynamically linked security tests is presented. The system may include at least one non-transitory storage device and at least one processing device coupled to the at least one non-transitory storage device, where the at least one processing device is configured to provide, based on a first queue, first data from a first data structure to a request engine, where the first data structure includes one or more pages of an application and one or more page links; perform, using the request engine, based on the first data, and based on test protocols stored in a second data structure, a first security test on the application; parse a first response of the application to the first security test to determine whether the application passed or failed the first security test; determine, based on determining that the application failed the first security test and based on a third data structure, whether the first security test is linked to one or more other security tests, where the third data structure includes security test sequences linking security tests; provide, to the first queue, based on determining that the first security test is linked to one or more other security tests, and based on a first security test sequence of the security test sequences, the one or more other security tests to which the first security test is linked; provide, based on the first queue and based on the one or more other security tests, second data from the first data structure to the request engine; and perform, using the request engine, based on the second data, and based on other test protocols stored in the second data structure, the one or more other security tests on the application.

In some embodiments, the at least one processing device is further configured to, when providing the one or more other security tests to the first queue, insert the one or more other security tests in the first queue such that the one or more other security tests are performed, using the request engine, immediately after the first security test.

In some embodiments, the security test sequences link the first security test to the one or more other security tests based on applications failing the first security test.

In some embodiments, the security test sequences include instructions for performing the one or more other security tests in one or more sequences based on applications failing each of the one or more other security tests.

In some embodiments, the first security test sequence includes performing a stack trace test, performing, based on receiving, from the application and in response to the stack trace test, a report containing sensitive information, an injection test, and performing, based on receiving, from the application and in response to the injection test, an access control test.

In some embodiments, the first security test sequence includes performing a path traversal test and performing, based on receiving, from the application and in response to the path traversal test, an improper limitation of a link, an unrestricted upload test.

In some embodiments, the one or more other security tests is a second security test, and the at least one processing device is further configured to parse a second response of the application to the second security test to determine whether the application passed or failed the second security test, determine, based on determining that the application failed the second security test and based on the third data structure, whether the second security test is linked to another security test, provide, to the first queue, based on determining that the second security test is linked to the other security test, the other security test to which the second security test is linked, provide, based on the first queue and based on the other security test, third data from the first data structure to the request engine, and perform, using the request engine, based on the third data, and based on other test protocols stored in the second data structure, the other security test on the application.

In some embodiments, the at least one processing device is further configured to obtain, using a downloader, a page of the application.

In some embodiments, the at least one processing device is further configured to store the page in the first data structure.

In some embodiments, the at least one processing device is further configured to add the one or more page links to a second queue for the downloader to obtain one or more other pages of the application via the one or more page links.

In some embodiments, the at least one processing device is further configured to determine whether the first response is valid.

In some embodiments, the at least one processing device is further configured to log, based on determining that the first response is valid, the first response.

In another aspect, a computer program product for testing an application with dynamically linked security tests is presented. The computer program product may include a non-transitory computer-readable medium including code causing a first apparatus to provide, based on a first queue, first data from a first data structure to a request engine, where the first data structure includes one or more pages of an application and one or more page links; perform, using the request engine, based on the first data, and based on test protocols stored in a second data structure, a first security test on the application; parse a first response of the application to the first security test to determine whether the application passed or failed the first security test; determine, based on determining that the application failed the first security test and based on a third data structure, whether the first security test is linked to one or more other security tests, where the third data structure includes security test sequences linking security tests; provide, to the first queue, based on determining that the first security test is linked to one or more other security tests, and based on a first security test sequence of the security test sequences, the one or more other security tests to which the first security test is linked; provide, based on the first queue and based on the one or more other security tests, second data from the first data structure to the request engine; and perform, using the request engine, based on the second data, and based on other test protocols stored in the second data structure, the one or more other security tests on the application.

In some embodiments, the non-transitory computer-readable medium may include code causing the first apparatus to, when providing the one or more other security tests to the first queue, insert the one or more other security tests in the first queue such that the one or more other security tests are performed, using the request engine, immediately after the first security test.

In some embodiments, the security test sequences link the first security test to the one or more other security tests based on applications failing the first security test.

In some embodiments, the security test sequences include instructions for performing the one or more other security tests in one or more sequences based on applications failing each of the one or more other security tests.

In some embodiments, the first security test sequence includes performing a stack trace test, performing, based on receiving, from the application and in response to the stack trace test, a report containing sensitive information, an injection test, and performing, based on receiving, from the application and in response to the injection test, an access control test.

In some embodiments, the first security test sequence includes performing a path traversal test and performing, based on receiving, from the application and in response to the path traversal test, an improper limitation of a link, an unrestricted upload test.

In yet another aspect, a method for testing an application with dynamically linked security tests is presented. The method may include providing, based on a first queue, first data from a first data structure to a request engine, where the first data structure includes one or more pages of an application and one or more page links, performing, using the request engine, based on the first data, and based on test protocols stored in a second data structure, a first security test on the application, parsing a first response of the application to the first security test to determine whether the application passed or failed the first security test, determining, based on determining that the application failed the first security test and based on a third data structure, whether the first security test is linked to one or more other security tests, where the third data structure includes security test sequences linking security tests, providing, to the first queue, based on determining that the first security test is linked to one or more other security tests, and based on a first security test sequence of the security test sequences, the one or more other security tests to which the first security test is linked, providing, based on the first queue and based on the one or more other security tests, second data from the first data structure to the request engine, and performing, using the request engine, based on the second data, and based on other test protocols stored in the second data structure, the one or more other security tests on the application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
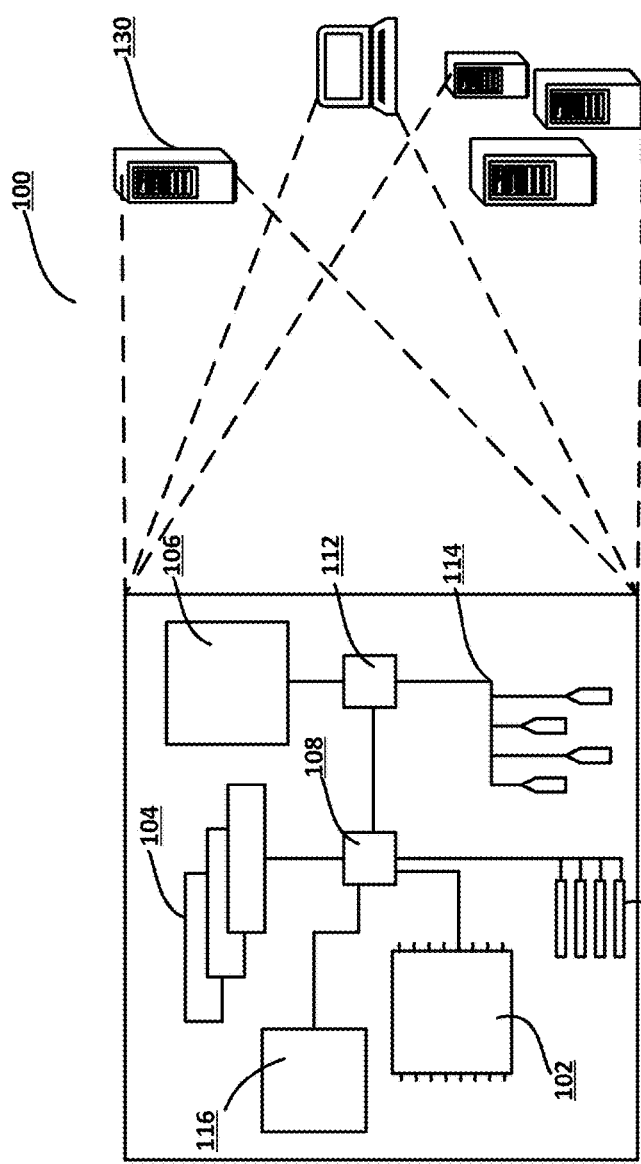
Figure 1:
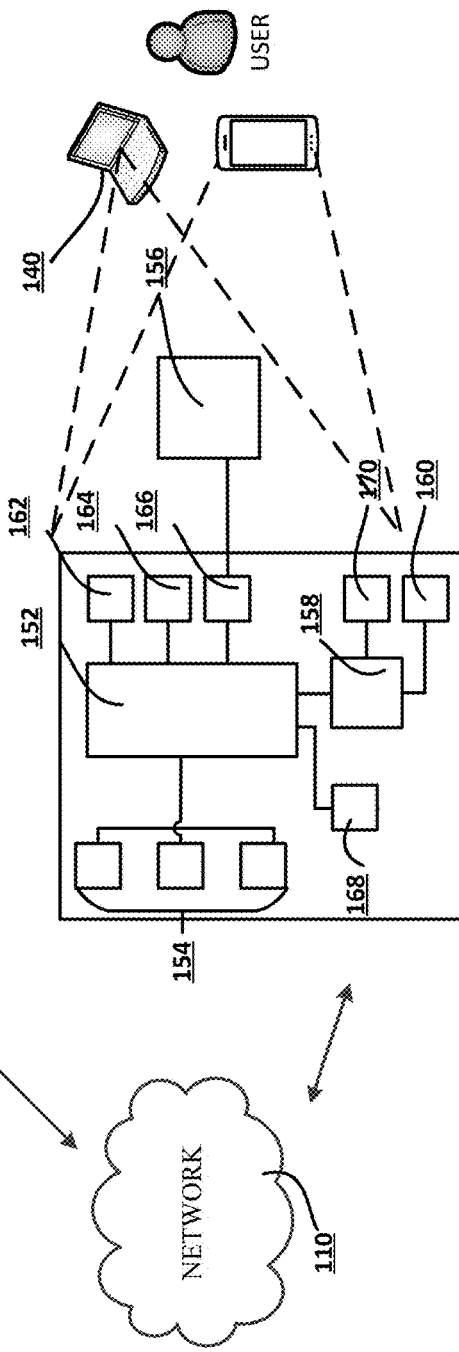
Figure 2:
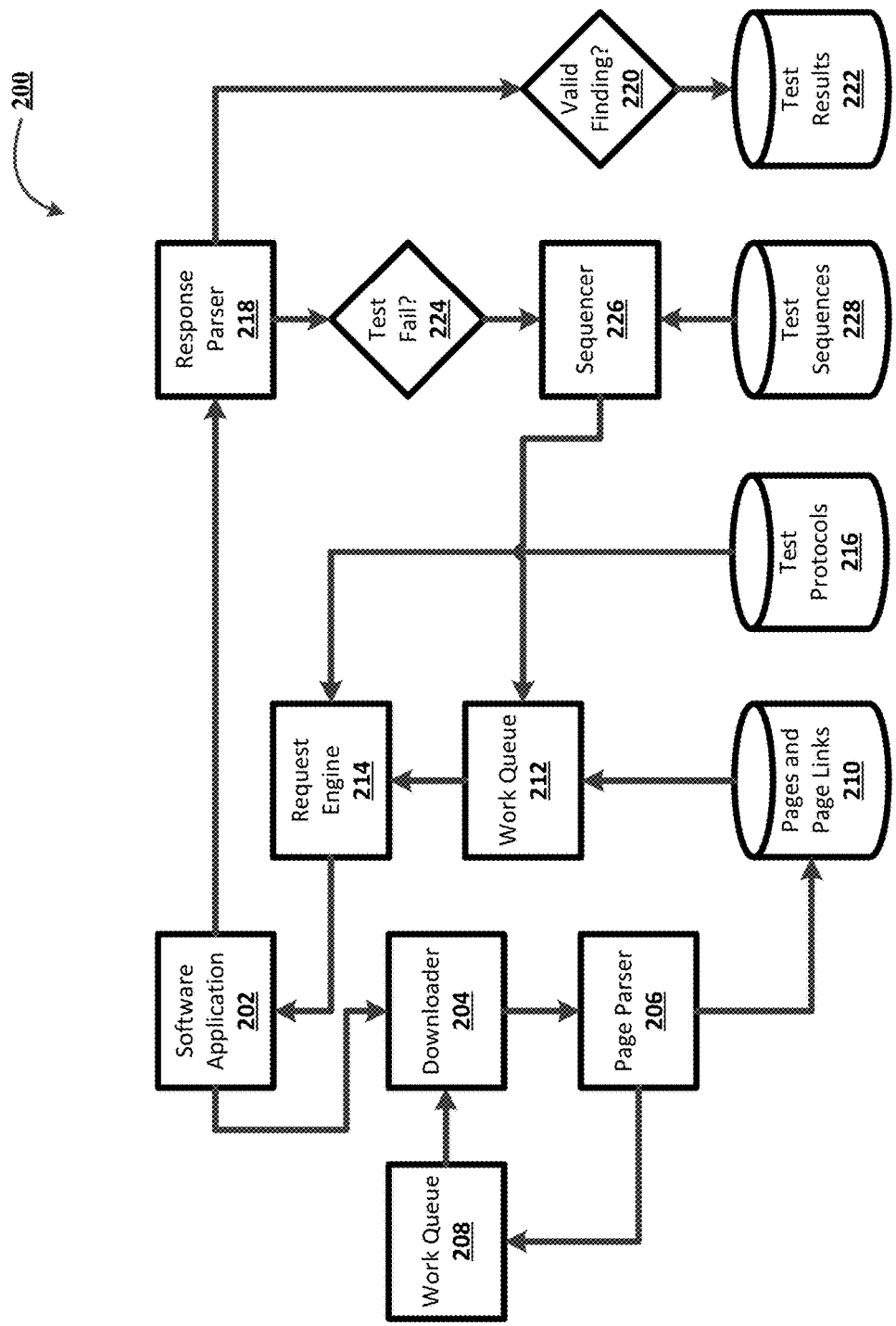
Figure 3:
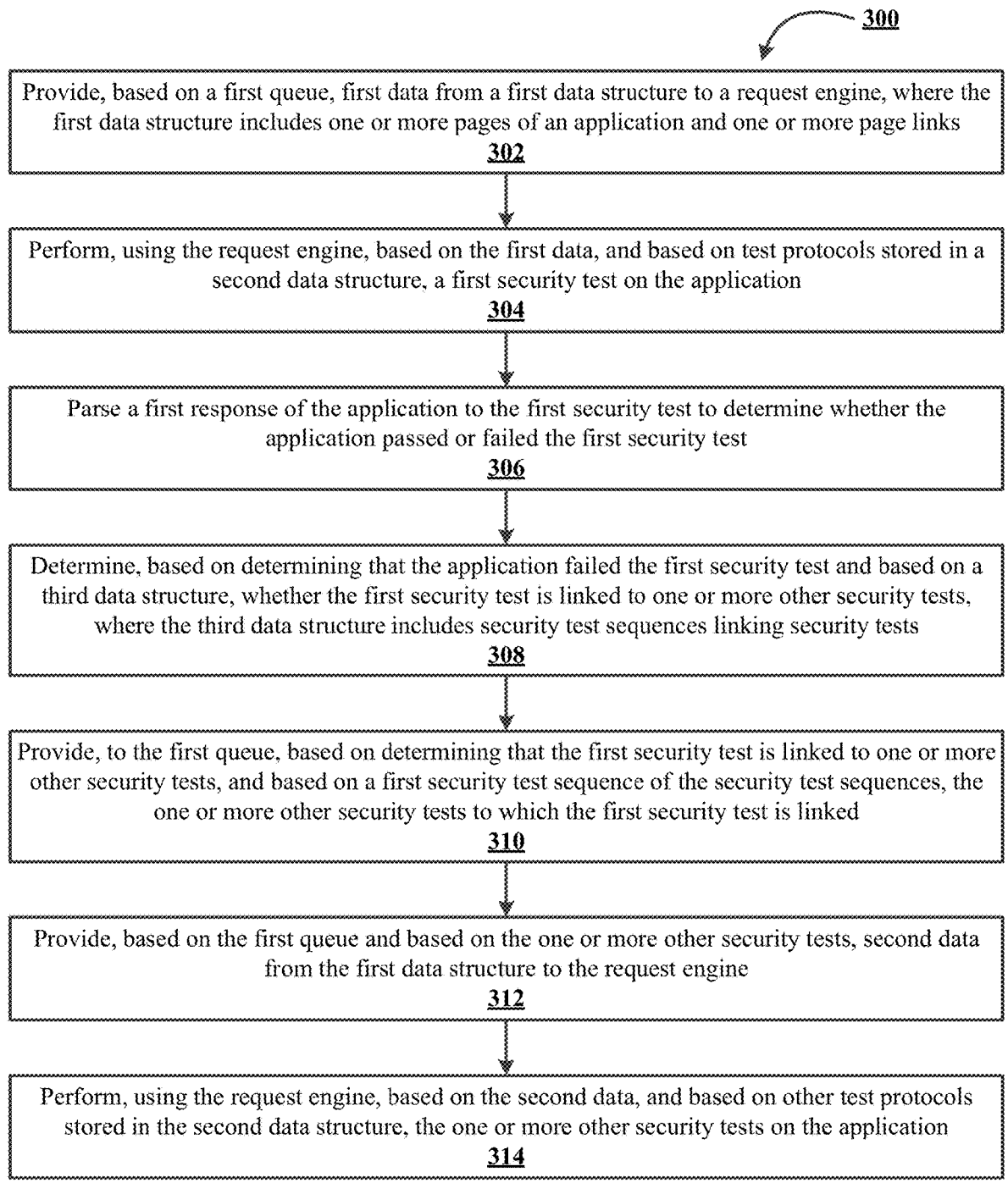

Having thus described embodiments of the invention in general terms, reference will now be made the accompanying drawings, wherein:

FIG. 1 illustrates technical components of a system for testing an application with dynamically linked security tests, in accordance with an embodiment of the invention;

FIG. 2 illustrates a process flow for testing an application with dynamically linked security tests, in accordance with an embodiment of the invention; and FIG. 3 illustrates a process flow for testing an application with dynamically linked security tests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include a graphical user interface (GUI) and/or an interface to input computer-executable instructions that direct a processing device to carry out functions. The user interface may employ input and/or output devices to input data received from a user and/or output data to a user. Input devices and/or output devices may include a display, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained, but may include externally-controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As noted, security of an application may be tested by performing security tests that each simulate a method that may be used to attempt to obtain unauthorized control of and/or access to the application, a system running the application, and/or the like and logging the response of the application to the security test. The log of responses may be analyzed to reveal weaknesses (e.g., flaws, faults, bugs, vulnerabilities, and/or the like) of the application that may be potential security vulnerabilities. The weaknesses may be categorized using a category system, such as the Common Weakness Enumeration (CWE), and steps may be taken to address the weaknesses of the application. However, because each security test is run individually (e.g., in isolation from other tests), the security tests fail to test logic within the application and fail to simulate human-driven attempts to obtain unauthorized control of and/or access to the application, a system running the application, and/or the like. Accordingly, even running a large number of different security tests in an automated manner fails to accurately simulate unauthorized attempts to obtain unauthorized control of and/or access to the application, a system running the application, and/or the like that may occur after the application is deployed.

Some embodiments described herein provide a system, a computer program product, and/or a method for testing an application with dynamically linked security tests. For example, a system may be configured to obtain, using a downloader, a page of the application, parse the page to obtain the one or more page links, store the page in a first data structure, and add the one or more page links to a queue for the downloader to obtain one or more other pages of the application via the one or more page links. The system may be further configured to provide, based on a queue for a request engine, first data from the first data structure to the request engine and perform, using the request engine, based on the first data, and based on test protocols stored in a second data structure, a first security test on the application. The system may be further configured to parse a first response of the application to the first security test to determine whether the application passed or failed the first security test and determine, based on determining that the application failed the first security test and based on a third data structure, whether the first security test is linked to one or more other security tests, where the third data structure includes security test sequences linking security tests. The system may be further configured to provide, to the queue for the request engine, based on determining that the first security test is linked to one or more other security tests, and based on a first security test sequence of the security test sequences, the one or more other security tests to which the first security test is linked. The system may be further configured to provide, based on the queue for the request engine and based on the one or more other security tests, second data from the first data structure to the request engine and perform, using the request engine, based on the second data, and based on other test protocols stored in the second data structure, the one or more other security tests on the application. The system may be further configured to determine whether responses of the application to security tests are valid and log valid responses (e.g., in a test results data structure).

In some embodiments, the system performs security testing on an application by using the results of security tests and a database of security test sequences to determine an order in which to perform the security tests and data transfer between test cases. The database of security test sequences stores predetermined sequences of tests that simulate methods for obtaining unauthorized control of and/or access to an application or system (e.g., known methods, human-driven methods, and/or the like). For example, if an application fails a security test, the system will then perform a predetermined sequence of tests to simulate a method for obtaining unauthorized control of and/or access to the application or the system that uses a weakness identified by the application failing the security test. By performing the testing based on results of one or more previously performed tests and the predetermined sequences and using the output from previous test results as input for following tests, the system may dynamically adjust the security testing of the application. In this way, the system may test logic within the application and simulate human-driven attempts to obtain unauthorized control of and/or access to the application, a system running the application, and/or the like. Accordingly, the system may perform a large number of different security tests in an automated manner to accurately simulate unauthorized attempts to obtain unauthorized control of and/or access to the application, a system running the application, and/or the like that may occur after the application is deployed.

FIG. 1 presents an exemplary block diagram of a system environment 100 for testing an application with dynamically linked security tests within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, analyze the results of, and/or the like security testing of one or more applications stored thereon. The one or more applications may be configured to communicate with the system 130, execute security tests, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for testing an application with dynamically linked security tests, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, an software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application, and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry, and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140, and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user can provide input to the computer, and/or a pointing device (e.g., a mouse or a trackball) by which the user can provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more application testing systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may user a user input system (e.g., similar to the user input system 140) to initiate testing of an application by an application testing system (e.g., similar to the system 130). In some embodiments, the user input system and/or the application testing system associated with the entity may perform one or more of the steps described herein with respect to the process flow described herein with respect to FIGS. 2 and/or 3.

FIG. 2 illustrates a process flow 200 for testing an application with dynamically linked security tests within a technical environment, in accordance with an embodiment of the invention. In some embodiments, a testing system (e.g., similar to one or more of the systems described herein with respect to FIG. 1) may perform one or more of the steps of process flow 200.

As shown in FIG. 2, the process flow 200 may include a software application 202, a downloader 204, a pages parser 206, a work queue 208 for the downloader 204, a pages and page links data structure 210, a work queue 212 for a request engine 214, the request engine 214, a test protocols data structure 216, a response parser 218, a test results data structure 222, a sequencer 226, and a test sequences data structure 228.

In some embodiments, the process flow 200 may include deploying the software application 202. For example, the software application 202 may be a web application. As shown in FIG. 2, the process flow 200 may include the downloader 204 downloading pages of the software application 202. For example, if there are no entries in the work queue 208, the downloader 204 may download a predetermined page (e.g., an index page and/or the like) of the software application 202.

As shown in FIG. 2, the process flow 200 may include the downloader 204 providing the pages to the page parser 206 and the page parser 206 accepting the output from the downloader 204. In some embodiments, the process flow 200 may include the page parser 206 identifying page links (e.g., anchor tags and/or the like) in the pages, and, as shown in FIG. 2, adding the page links to the work queue 208 for the downloader 204.

As also shown in FIG. 2, the process flow 200 may include the page parser 206 providing the pages and page links to the pages and page links data structure 210 for storage. In some embodiments, and as shown in FIG. 2, the process flow 200 may include the work queue 208 providing data to the downloader 204 for downloading and processing operations.

As shown in FIG. 2, the process flow 200 may include the work queue 212 for the request engine 214 obtaining data from the pages and page links data structure 210 and providing the data to the request engine 214. For example, the process flow 200 may include the request engine 214 providing data based on the pages of the software application 202 downloaded by the downloader 204 and stored, by the page parser 206, in the pages and page links data structure 210.

As shown in FIG. 2, the process flow 200 may include the request engine 214 receiving data and/or information from the work queue 212, obtaining test protocols from the test protocols data structure 216, and/or invoking traffic to perform security testing, based on the test protocols, on the software application 202. For example, the process flow 200 may include the request engine 214 performing a security test on the software application 202 based on the test protocols from the test protocols data structure 216 and based on the data and/or information from the work queue 212.

As shown in FIG. 2, the process flow 200 may include the response parser 218 receiving response results from the software application 202 triggered by the security testing performed, by the request engine 214, on the software application 202. For example, when the request engine 214 performs a security test on the software application 202 based on a test protocol, the software application 202 may generate a response to the security test, and the response parser 218 may receive the response and parse the response.

As shown in FIG. 2, and by reference number 220, the process flow 200 may include determining whether the response from the software application 202 is valid. In some embodiments, and as shown in FIG. 2, the process flow 200 may include storing, based on determining that the response from the software application 202 is valid, the response in the test results data structure 222. Additionally, or alternatively, the process flow 200 may include not storing, based on determining that the response from the software application 202 is invalid, the response in the test results data structure 22 and/or providing a notification to the work queue 212 to repeat the security test and/or test protocol that triggered the invalid response from the software application 202.

In some embodiments, the process flow 200 may include storing results in the test results data structure 222 based on determining that the response is valid and based on determining that the response indicates that the software application 202 failed the security test. For example, the process flow 200 may include only storing results in the test results data structure 222 if a response is valid and indicates that the software application 202 failed a security test.

As shown in FIG. 2, and by reference number 224, the process flow 200 may include determining whether the response from the software application 202 indicates that the software application 202 failed the security test. For example, the response parser 218 may parse the response of the software application 202 to a security test, and the process flow 200 may include analyzing the parsed response to determine whether the software application 202 failed the security test.

As shown in FIG. 2, the process flow 200 may include the sequencer 226 obtaining, from the test sequences data structure 228 and based on determining that the response from the software application 202 indicates that the software application 202 failed the security test, one or more other security tests and/or one or more other security test sequences that are linked (e.g., in the test sequences data structure 228) to the security test that the software application 202 failed. For example, the test sequences data structure 228 may include predetermined sequences of security tests to simulate a method for obtaining unauthorized control and/or access to the software application 202 that uses a weakness identified by the software application 202 failing the security test.

Additionally, or alternatively, the process flow 200 may include determining, based on the output of the response parser 218, whether information provided in a response of the software application 202 to a security test is linked to one or more other security tests and/or one or more sequences of security tests. For example, if a response of the software application 202 to a security test provides information that may increase a likelihood of one or more other security tests and/or one or more sequences of security tests obtaining unauthorized control and/or access to the software application 202, the process flow 200 may include the sequencer 226 obtaining, from the test sequences data structure 228, the one or more other security tests and/or the one or more sequences of security tests with an increased likelihood of obtaining unauthorized control and/or access to the software application 202.

In some embodiments, the process flow 200 may include determining, based on determining that the response from the software application 202 indicates that the software application 202 failed the security test and based on data in the test sequences data structure 228, whether the security test that the software application 202 failed is linked to one or more other security tests and/or one or more sequences of security tests. For example, the process flow 200 may include identifying, based on data in the test sequences data structure 228, one or more other security tests and/or one or more sequences of security tests that are linked to the security test that the software application 202 failed. Additionally, or alternatively, the process flow 200 may include obtaining, from the test sequences data structure 228 and based on determining that the security test that the software application 202 failed is linked to one or more other security tests and/or one or more sequences of security tests, the one or more other security tests and/or one or more sequences of security tests.

As shown in FIG. 2, the process flow 200 may include the sequencer 226 providing, to the work queue 212, the one or more other security tests and/or one or more sequences of security tests. For example, the process flow 200 may include the sequencer 226 providing, to the work queue 212, the one or more other security tests and/or one or more sequences of security tests linked to the security test that the software application 202 failed. Additionally, or alternatively, the process flow 200 may include the sequencer 226 providing, to the work queue 212, the one or more other security tests and/or one or more sequences of security tests with an increased likelihood of obtaining unauthorized control and/or access to the software application 202.

In some embodiments, the process flow 200 may include the sequencer 226 providing, to the work queue 212, additional data (e.g., context from the response parser 218 and/or the like). For example, if a response of the software application 202 to a security test provides information that may increase a likelihood of one or more other security tests and/or one or more sequences of security tests obtaining unauthorized control and/or access to the software application 202, the process flow 200 may include providing, to the work queue 212, the information.

Additionally, or alternatively, the process flow 200 may include the sequencer 226 inserting, into the work queue 212, the one or more other security tests and/or one or more sequences of security tests such that the work queue 212 provides the one or more other security tests and/or one or more sequences of security tests to the request engine 214 before other security tests. For example, the process flow 200 may include the sequencer 226 inserting, into the work queue 212, the one or more other security tests and/or one or more sequences of security tests such that the request engine 214 performs the one or more other security tests and/or one or more sequences of security tests immediately after the security test that the software application 202 failed (e.g., using data provided by the first security test, a previously performed security test, and/or the like).

In some embodiments, the process flow 200 may include the work queue 212 providing, to the request engine 214, the one or more other security tests, the one or more sequences of security tests, additional data, information, and/or the like from the sequencer 226. Additionally, or alternatively, the process flow 200 may include the request engine 214 receiving the one or more sequences of security tests, additional data, information, and/or the like from the sequencer 226, obtaining test protocols from the test protocols data structure 216, and/or invoking traffic to perform security testing, based on the test protocols, on the software application 202. For example, the process flow 200 may include the request engine 214 performing the one or more other security tests and/or the one or more sequences of security tests on the software application 202 based on the test protocols from the test protocols data structure 216 and based on the additional data, information, and/or the like from the work queue 212.

In some embodiments, the process flow 200 may include extracting results from a first security test (e.g., from a stack trace) and performing, based on receiving, from the application and in response to the results (e.g., stack trace), another security test and/or another type of security test using those results (e.g., the first security test report containing sensitive information).

In some embodiments, a testing system may repeat the process flow 200 until each test protocol in the test protocols data structure 216 has been used to perform security testing on the software application 202, until each test sequence in the test sequences data structure 228 has been used to perform security testing on the software application 202, until each page of the software application 202 has been tested, until each page link of the software application 202 has been tested, and/or the like.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for testing an application with dynamically linked security tests within a technical environment, in accordance with an embodiment of the invention. In some embodiments, a testing system (e.g., similar to one or more of the systems described herein with respect to FIG. 1) may perform one or more of the steps of process flow 300.

As shown in block 302, the process flow 300 may include providing, based on a first queue, first data from a first data structure to a request engine, where the first data structure includes one or more pages of an application and one or more page links. For example, the testing system may provide, based on a first queue, first data from a first data structure to a request engine, where the first data structure includes one or more pages of an application and one or more page links. In some embodiments, the application may be a software application to be tested, and/or the application may be installed on hardware, infrastructure, and/or the like to be tested.

As shown in block 304, the process flow 300 may include performing, using the request engine, based on the first data, and based on test protocols stored in a second data structure, a first security test on the application. For example, the testing system may perform, using the request engine, based on the first data, and based on test protocols stored in a second data structure, a first security test on the application.

As show in block 306, the process flow 300 may include parsing a first response of the application to the first security test to determine whether the application passed or failed the first security test. For example, the testing system may parse a first response of the application to the first security test to determine whether the application passed or failed the first security test.

As shown in block 308, the process flow 300 may include determining, based on determining that the application failed the first security test and based on a third data structure, whether the first security test is linked to one or more other security tests, where the third data structure includes security test sequences linking security tests. For example, the testing system may determine, based on determining that the application failed the first security test and based on a third data structure, whether the first security test is linked to one or more other security tests. In some embodiments, the third data structure may include security test sequences linking security tests and requisite inter-test data transfer.

As shown in block 310, the process flow 300 may include providing, to the first queue, based on determining that the first security test is linked to one or more other security tests, and based on a first security test sequence of the security test sequences, the one or more other security tests to which the first security test is linked. For example, the testing system may provide, to the first queue, based on determining that the first security test is linked to one or more other security tests, and based on a first security test sequence of the security test sequences, the one or more other security tests to which the first security test is linked.

As shown in block 312, the process flow 300 may include providing, based on the first queue and based on the one or more other security tests, second data from the first data structure to the request engine. For example, the testing system may provide, based on the first queue and based on the one or more other security tests, second data from the first data structure to the request engine.

As shown in block 314, the process flow 300 may include performing, using the request engine, based on the second data, and based on other test protocols stored in the second data structure, the one or more other security tests on the application. For example, the testing system may perform, using the request engine, based on the second data, and based on other test protocols stored in the second data structure, the one or more other security tests on the application.

In some embodiments, the testing system may repeat the process flow 300 until each test protocol stored in the second data structure has been performed, until each security sequence in the third data structure has been performed, until each page of the application has been tested, until each page link of the application has been tested, and/or the like.

Process flow 300 may include additional embodiments, such as any single embodiment or any combination of embodiments described below and/or in connection with one or more other processes described elsewhere herein.

In a first embodiment, the process flow 300 may include, when providing the one or more other security tests to the first queue, inserting the one or more other security tests in the first queue such that the one or more other security tests are performed, using the request engine, immediately after the first security test.

In a second embodiment alone or in combination with the first embodiment, the security test sequences link the first security test to the one or more other security tests based on applications failing the first security test (e.g., security test case success).

In a third embodiment alone or in combination with any of the first through second embodiments, the security test sequences include instructions for performing the one or more other security tests in one or more sequences based on applications failing each of the one or more other security tests.

In a fourth embodiment alone or in combination with any of the first through third embodiments, the first security test sequence may include performing a stack trace test, performing, based on receiving, from the application and in response to the stack trace test, a report containing sensitive information, an injection test, and performing, based on receiving, from the application and in response to the injection test, an access control test.

In a fifth embodiment alone or in combination with any of the first through fourth embodiments, the first security test sequence may include performing a path traversal test and performing, based on receiving, from the application and in response to the path traversal test, an improper limitation of a link, an unrestricted upload test.

In a sixth embodiment alone or in combination with any of the first through fifth embodiments, the one or more other security tests is a second security test and the process flow 300 includes parsing a second response of the application to the second security test to determine whether the application passed or failed the second security test, determining, based on determining that the application failed the second security test and based on the third data structure, whether the second security test is linked to another security test, providing, to the first queue, based on determining that the second security test is linked to the other security test, the other security test to which the second security test is linked, providing, based on the first queue and based on the other security test, third data from the first data structure to the request engine, and performing, using the request engine, based on the third data, and based on other test protocols stored in the second data structure, the other security test on the application.

In a seventh embodiment alone or in combination with any of the first through sixth embodiments, the process flow 300 includes obtaining, using a downloader, a page of the application.

In an eighth embodiment alone or in combination with any of the first through seventh embodiments, the process flow 300 includes parsing the page to obtain the one or more page links.

In a ninth embodiment alone or in combination with any of the first through eighth embodiments, the process flow 300 includes storing the page in the first data structure.

In a tenth embodiment alone or in combination with any of the first through ninth embodiments, the process flow 300 includes adding the one or more page links to a second queue for the downloader to obtain one or more other pages of the application via the one or more page links.

In an eleventh embodiment alone or in combination with any of the first through tenth embodiments, the process flow 300 includes determining whether the first response is valid.

In a twelfth embodiment alone or in combination with any of the first through eleventh embodiments, the process flow 300 includes logging, based on determining that the first response is valid, the first response.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As noted above, weaknesses of an application may be categorized using a category system, such as the Common Weakness Enumeration (CWE), and steps may be taken to identify the weaknesses of an application. In some embodiments, a testing system (e.g., similar to one or more of the systems described herein with respect to FIG. 1) may be configured to parse a response of an application to a security test and determine, based on the parsed response and the CWE, a weakness ID. Additionally, or alternatively, the testing system may be configured to perform, based on the weakness ID, one or more other security tests (e.g., one or more security test sequences).

For example, the testing system may be configured to perform, based on a response of an application indicating a CWE-22 (e.g., for an improper limitation of a pathname to a restricted directory, a path traversal, and/or the like), a security test to determine if information from the CWE-22 may be used to perform an unrestricted upload of a file with dangerous type (e.g., a CWE-434). Such an example may allow the testing system to identify an application vulnerable to an advanced persistent threat, whereby an unauthorized user may plant a key within the application and/or a system running the application that may be used by the unauthorized user to obtain unauthorized access and/or control of the application and/or the system.

As another example, the testing system may be configured to perform, based on a response of an application indicating a CWE-497 (e.g., for exposure of sensitive system information to an unauthorized control sphere and/or the like), a CWE-209 (e.g., for generation of error message containing sensitive information and/or the like), and/or the like, a security test to determine if information from the CWE-497, the CWE-209, and/or the like may be used to perform an improper neutralization of special elements used in a SQL command (e.g., a CWE-89, a SQL injection, and/or the like). Furthermore, the system may be configured to perform, based on performing the improper neutralization of special elements used in the SQL command, a security test to determine if the improper neutralization of special elements used in the SQL command permits the application to resolve documents outside of an intended sphere of control (e.g., a CWE-611, an improper restriction of an XML external entity reference, and/or the like). Such an example may allow the testing system to identify an application vulnerable to unauthorized access and/or control of the application and/or a system running the application (e.g., using domain name server (DNS) poisoning and/or the like).

As yet another example, the testing system may be configured to perform, based on a response of an application indicating a CWE-209 (e.g., for generation of error message containing sensitive information and/or the like) and/or the like, a security test to determine if information from the CWE-209 may be used to perform a server-side request forgery (e.g., a CWE-918 and/or the like). Furthermore, the system may be configured to perform, based on a result of the server-side request forgery, a security test to determine if the server-side request forgery permits improper access control (e.g., a CWE-284, the application does not restrict and/or incorrectly restricts access to a resource from an unauthorized actor, and/or the like). Such an example may allow the testing system to identify an application vulnerable to unauthorized access and/or control of the application and/or a system running the application.

In some embodiments, the testing system may be configured to use responses of an application (e.g., results and/or the like) and/or information obtained from a security test to determine one or more other tests, one or more test sequences, one or more test branches, and/or the like to be performed (e.g., based on a CWE-22 positive response, perform a CWE-434 test and/or the like). Additionally, or alternatively, the testing system may be configured to use responses of an application (e.g., results and/or the like) and/or information obtained from a security test as input for one or more other tests, one or more test sequences, one or more test branches, and/or the like (e.g., output of CWE-22 test as data feed for a CWE-434 test and/or the like).

In some embodiments, the testing system may perform testing on an application before deployment of the application and/or at a time of deploying the application, which may permit weaknesses of the application to be resolved earlier, thereby conserving financial, computer, and/or network resources consumed by weaknesses of the application. In some embodiments, the testing system may identify business logic tests, which are currently undetectable. In some embodiments, the testing system may perform automated business logic testing.

In some embodiments, the testing system may include a component for storing and/or parsing output from one dynamic test and providing the output to another dynamic test. Additionally, or alternatively, the testing system may include a data structure of linkages between CWEs (e.g., which tests should follow a successful CWE test invocation). In some embodiments, the testing system may include a component for parsing output from a successful CWE test invocation. Additionally, or alternatively, the testing system may include a component for providing data into CWE test invocation.

In some embodiments, the process flow 200 and/or the process flow 300 may include performing one or more of the functions described herein using machine learning and/or a machine learning model. For example, the system may provide data from parsed responses, data from failed security tests, data from valid responses, data from invalid responses, and/or the like to a machine learning model trained (e.g., using historical data) to output security test sequences, work queues for the downloader, work queues for the request engine, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for testing an application with dynamically linked security tests, the system comprising:
    at least one non-transitory storage device; and
    at least one processing device coupled to the at least one non-transitory storage device, wherein the at least one processing device is configured to:
        provide, based on a first queue, first data from a first data structure to a request engine, wherein the first data structure comprises one or more pages of an application and one or more page links;
        perform, using the request engine, based on the first data, and based on test protocols stored in a second data structure, a first security test on the application;
        parse a first response of the application to the first security test to determine whether the application passed or failed the first security test;
        determine, based on determining that the application failed the first security test and based on a third data structure, whether the first security test is linked to one or more other security tests, wherein the third data structure comprises security test sequences linking security tests;
        provide, to the first queue, based on determining that the first security test is linked to one or more other security tests, and based on a first security test sequence of the security test sequences, the one or more other security tests to which the first security test is linked;
        provide, based on the first queue and based on the one or more other security tests, second data from the first data structure to the request engine; and
        perform, using the request engine, based on the second data, and based on other test protocols stored in the second data structure, the one or more other security tests on the application.

2. The system of claim 1, wherein the at least one processing device is further configured to, when providing the one or more other security tests to the first queue, insert the one or more other security tests in the first queue such that the one or more other security tests are performed, using the request engine, immediately after the first security test.

3. The system of claim 1, wherein the security test sequences link the first security test to the one or more other security tests based on applications failing the first security test.

4. The system of claim 1, wherein the security test sequences comprise instructions for performing the one or more other security tests in one or more sequences based on applications failing each of the one or more other security tests.

5. The system of claim 1, wherein the first security test sequence comprises:
   performing a stack trace test;
   performing, based on receiving, from the application and in response to the stack trace test, a report containing sensitive information, an injection test; and
   performing, based on receiving, from the application and in response to the injection test, an access control test.

6. The system of claim 1, wherein the first security test sequence comprises:
   performing a path traversal test; and
   performing, based on receiving, from the application and in response to the path traversal test, an improper limitation of a link, an unrestricted upload test.

7. The system of claim 1, wherein the one or more other security tests is a second security test, and wherein the at least one processing device is further configured to:
   parse a second response of the application to the second security test to determine whether the application passed or failed the second security test;
   determine, based on determining that the application failed the second security test and based on the third data structure, whether the second security test is linked to another security test;
   provide, to the first queue, based on determining that the second security test is linked to the other security test, the other security test to which the second security test is linked;
   provide, based on the first queue and based on the other security test, third data from the first data structure to the request engine; and
   perform, using the request engine, based on the third data, and based on other test protocols stored in the second data structure, the other security test on the application.

8. The system of claim 1, wherein the at least one processing device is further configured to obtain, using a downloader, a page of the application.

9. The system of claim 8, wherein the at least one processing device is further configured to parse the page to obtain the one or more page links.

10. The system of claim 9, wherein the at least one processing device is further configured to store the page in the first data structure.

11. The system of claim 10, wherein the at least one processing device is further configured to add the one or more page links to a second queue for the downloader to obtain one or more other pages of the application via the one or more page links.

12. The system of claim 1, wherein the at least one processing device is further configured to determine whether the first response is valid.

13. The system of claim 12, wherein the at least one processing device is further configured to log, based on determining that the first response is valid, the first response.

14. A computer program product for testing an application with dynamically linked security tests, the computer program product comprising a non-transitory computer-readable medium comprising code causing a first apparatus to:
   provide, based on a first queue, first data from a first data structure to a request engine, wherein the first data structure comprises one or more pages of an application and one or more page links;
   perform, using the request engine, based on the first data, and based on test protocols stored in a second data structure, a first security test on the application;
   parse a first response of the application to the first security test to determine whether the application passed or failed the first security test;
   determine, based on determining that the application failed the first security test and based on a third data structure, whether the first security test is linked to one or more other security tests, wherein the third data structure comprises security test sequences linking security tests;
   provide, to the first queue, based on determining that the first security test is linked to one or more other security tests, and based on a first security test sequence of the security test sequences, the one or more other security tests to which the first security test is linked;
   provide, based on the first queue and based on the one or more other security tests, second data from the first data structure to the request engine; and
   perform, using the request engine, based on the second data, and based on other test protocols stored in the second data structure, the one or more other security tests on the application.

15. The computer program product of claim 14, wherein the non-transitory computer-readable medium comprises code causing the first apparatus to, when providing the one or more other security tests to the first queue, insert the one or more other security tests in the first queue such that the one or more other security tests are performed, using the request engine, immediately after the first security test.

16. The computer program product of claim 14, wherein the security test sequences link the first security test to the one or more other security tests based on applications failing the first security test.

17. The computer program product of claim 14, wherein the security test sequences comprise instructions for performing the one or more other security tests in one or more sequences based on applications failing each of the one or more other security tests.

18. The computer program product of claim 14, wherein the first security test sequence comprises:
   performing a stack trace test;
   performing, based on receiving, from the application and in response to the stack trace test, a report containing sensitive information, an injection test; and
   performing, based on receiving, from the application and in response to the injection test, an access control test.

19. The computer program product of claim 14, wherein the first security test sequence comprises:
   performing a path traversal test; and
   performing, based on receiving, from the application and in response to the path traversal test, an improper limitation of a link, an unrestricted upload test.

20. A method for testing an application with dynamically linked security tests, the method comprising:
   providing, based on a first queue, first data from a first data structure to a request engine, wherein the first data structure comprises one or more pages of an application and one or more page links;

performing, using the request engine, based on the first data, and based on test protocols stored in a second data structure, a first security test on the application;

parsing a first response of the application to the first security test to determine whether the application passed or failed the first security test;

determining, based on determining that the application failed the first security test and based on a third data structure, whether the first security test is linked to one or more other security tests, wherein the third data structure comprises security test sequences linking security tests;

providing, to the first queue, based on determining that the first security test is linked to one or more other security tests, and based on a first security test sequence of the security test sequences, the one or more other security tests to which the first security test is linked;

providing, based on the first queue and based on the one or more other security tests, second data from the first data structure to the request engine; and performing, using the request engine, based on the second data, and based on other test protocols stored in the second data structure, the one or more other security tests on the application.

* * * * *